(No Model.)
I. BROOKE.
HITCHING BOX.
No. 447,937. Patented Mar. 10, 1891.
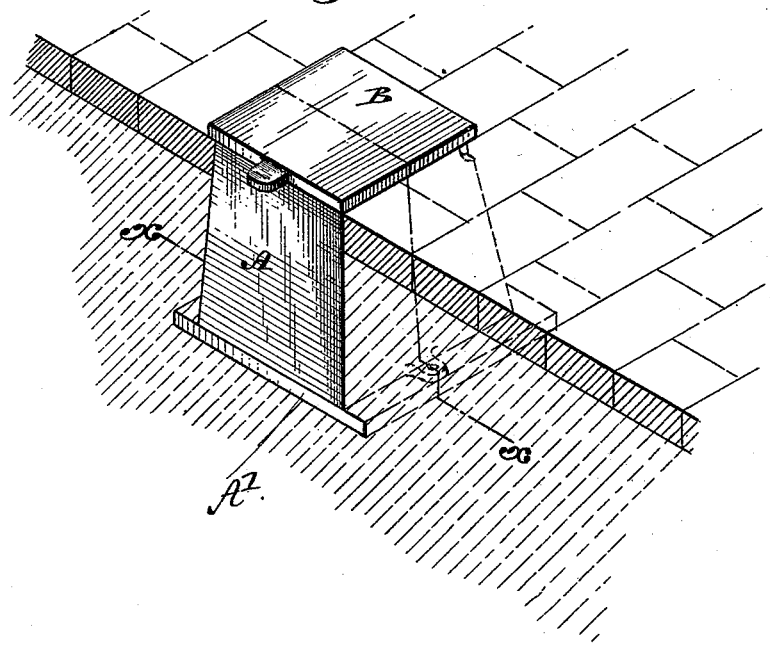
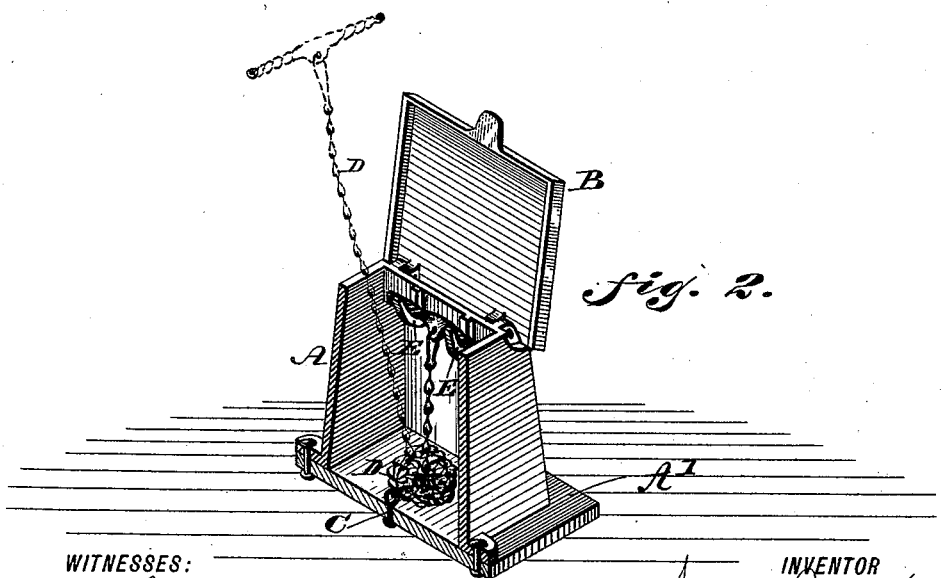
WITNESSES:
L. Douville,
P. F. Chagles.
INVENTOR
Isaac Brooke
BY John A. Wiedersheim
ATTORNEY.

UNITED STATES PATENT OFFICE.

ISAAC BROOKE, OF POTTSTOWN, PENNSYLVANIA.

HITCHING-BOX.

SPECIFICATION forming part of Letters Patent No. 447,937, dated March 10, 1891.

Application filed January 24, 1890. Serial No. 338,002. (No model.)

*To all whom it may concern:*

Be it known that I, ISAAC BROOKE, a citizen of the United States, residing at Pottstown, in the county of Montgomery and State of Pennsylvania, have invented a new and useful Improvement in Hitching-Boxes, which improvement is fully set forth in the following specification and accompanying drawings.

My invention consists of a box adapted to be placed in a sidewalk, street, road, &c., to receive a hitching chain or strap, said box being provided with hooks for sustaining the upper end of the chain.

Figure 1 represents a perspective view of a hitching-box embodying my invention. Fig. 2 represents a vertical section thereof in perspective.

Similar letters of reference indicate corresponding parts in the two figures.

Referring to the drawings, A designates a box, having a lid B hinged thereto. Connected with the bottom or base of the box is a hook or eye C, to which is attached the hitching chain or strap D.

Within the box, at the upper end thereof, are hooks E, on which may be supported the cross-bar or outer end of the chain or strap.

It will be seen that when the box is in position it is covered by the lid B, and when said lid is opened the chain or strap is accessible, whereby an animal may be hitched and the chain or strap remain connected with the box. When the animal is unhitched, the chain or strap is returned into the box and the cross-bar or outer end rested on or connected with the hooks E, whereby it is always within reach and held elevated above water that may enter the box. When the lid is closed, the chain or strap is entirely concealed and shielded from the weather.

The bottom of the box is formed with a flange A' and tapering sides.

It will be understood that the box is adapted to be embedded, and by means of the said construction of flange and tapering sides the vertical displacement of the box is prevented.

Having thus described my invention, what I claim as new, and desire to secure by Letters Patent, is—

1. A hitching-box adapted to be embedded and provided with a cover and with inwardly-projecting parallel hooks attached to the upper part of one side of the box for the support of the bar of the chain, thereby leaving the main portion of the top free for insertion of the hand into and under the chain-bar, said hooks being separated, so that the fingers may pass under and grasp the bar between said hooks, substantially as and for the purpose set forth.

2. A hitching-box adapted to be embedded and having a bottom flange and tapering sides to resist vertical displacement, and a hinged cover, a chain attached at its lower end, and inwardly-projecting hooks attached to one side near the upper edge of said box and centrally separated, substantially as and for the purpose set forth.

ISAAC BROOKE.

Witnesses:
JOHN A. WIEDERSHEIM,
L. JENNINGS.